Figure 1:
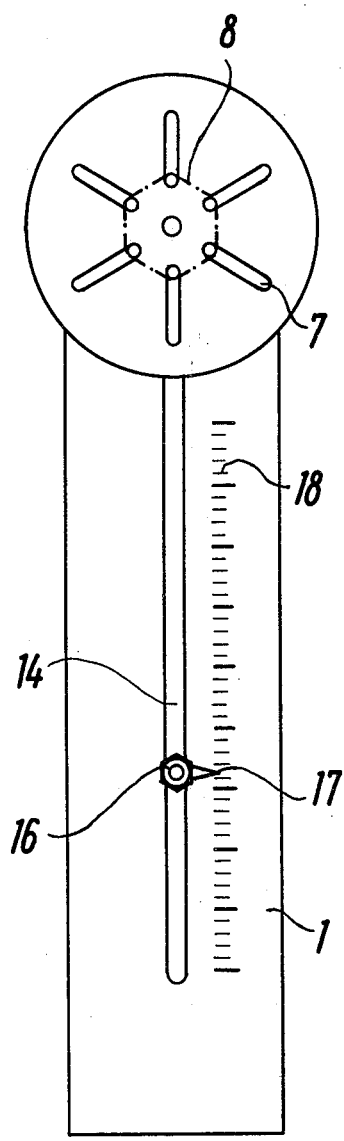

United States Patent [19]

Wanke

[11] 4,170,903
[45] Oct. 16, 1979

[54] BALANCING APPARATUS FOR BLADE SETS FOR A CUTTER

[75] Inventor: Günter Wanke, Kuppenheim, Fed. Rep. of Germany

[73] Assignee: Georg Wanke, Fed. Rep. of Germany

[21] Appl. No.: 929,795

[22] Filed: Jul. 31, 1978

[30] Foreign Application Priority Data

Jul. 29, 1977 [DE] Fed. Rep. of Germany ....... 2734260
Sep. 3, 1977 [DE] Fed. Rep. of Germany ....... 2739740

[51] Int. Cl.² .............................................. G01M 1/36
[52] U.S. Cl. .......................................... 73/480; 73/65; 73/470
[58] Field of Search ...................... 73/66, 65, 455–456, 73/468, 470, 480–482; 82/DIG. 8; 83/503

[56] References Cited

U.S. PATENT DOCUMENTS

| 2,459,947 | 1/1949 | Leflar | 73/470 |
| 3,659,463 | 5/1972 | Karrels | 73/480 |

FOREIGN PATENT DOCUMENTS

| 632178 | 7/1936 | Fed. Rep. of Germany | 73/65 |
| 1118872 | 3/1956 | France | 73/65 |

*Primary Examiner*—James J. Gill
*Attorney, Agent, or Firm*—Craig and Antonelli

[57] ABSTRACT

An apparatus for balancing of blade sets for a cutter with the blade sets including at least one cutter blade provided with a carrier bore having a hexagonal profile. The cutter blades are provided with at least one clamping set having at least one compensating ring which is held to be rotatable about an axis of rotation of the carrier bore of the cutter blades and which has a mass distribution which is asymmetrical with respect to the axis of rotation of the carrier bore. A holding fixture is provided for the cutter blades and the clamping set with a support, fastened to a fixed support structure, having the holding fixture mounted thereon. The holding fixture is adjustable to accommodate carrier bores having differing hexagonal profiles and a marking stop is attached to the support, which marking stop is adjustable in a radial direction with respect to a rotary axle connected to the holding fixture.

21 Claims, 8 Drawing Figures

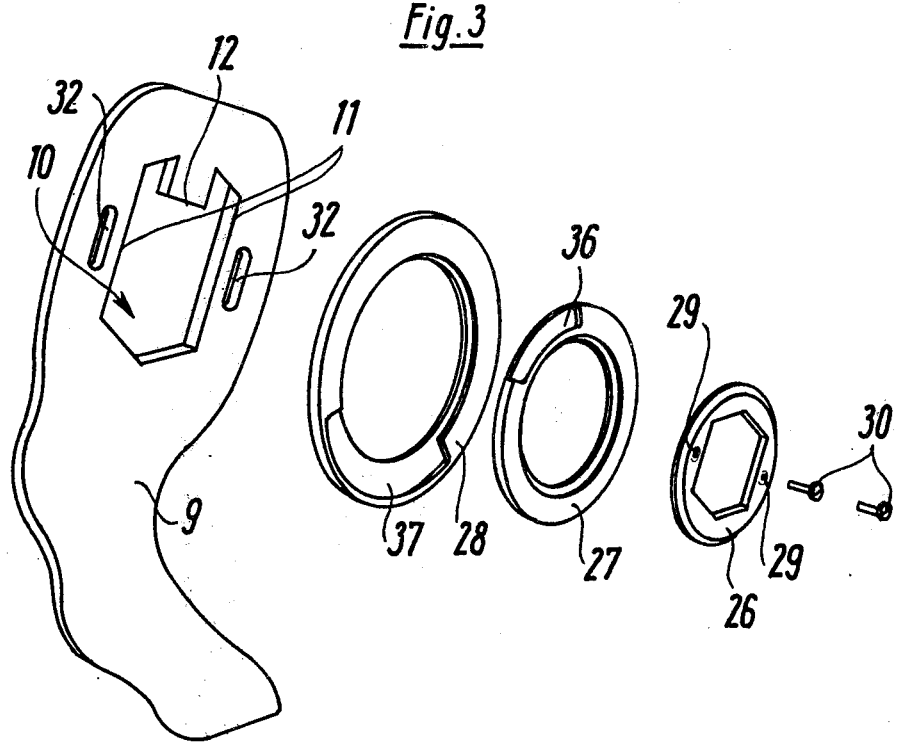

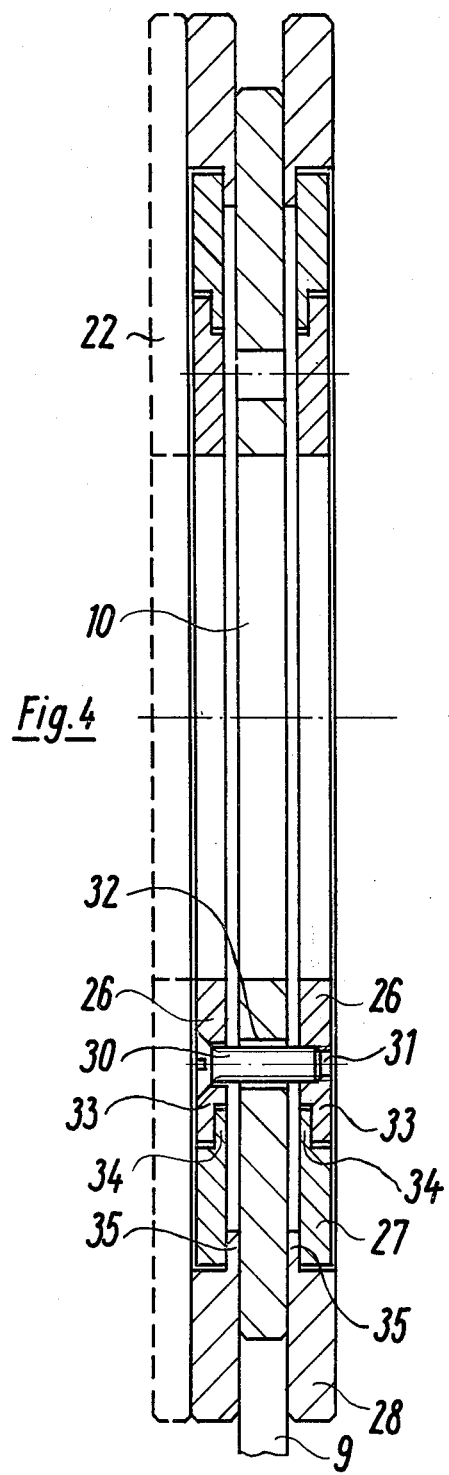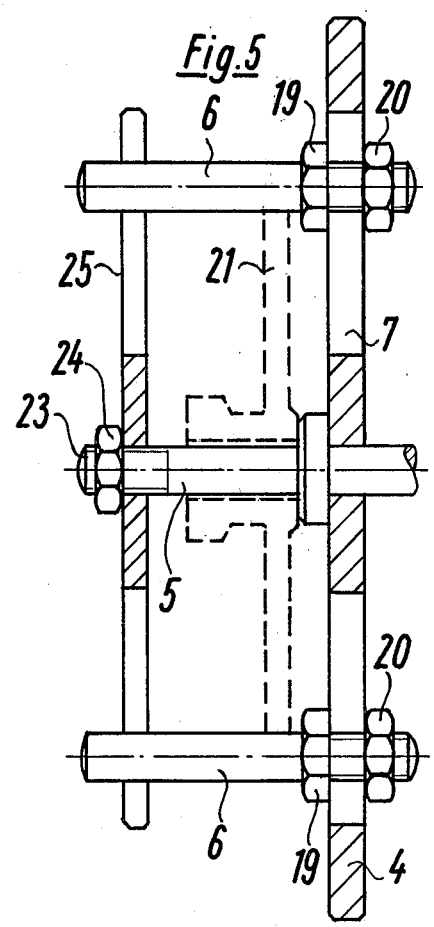

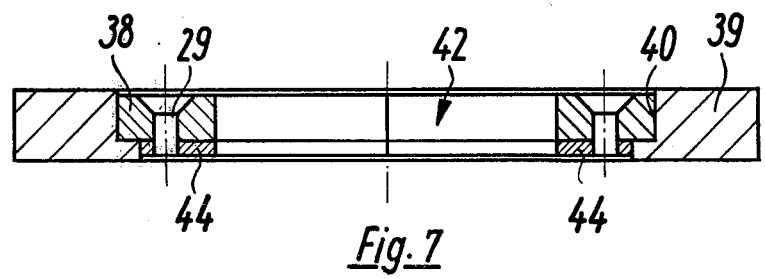
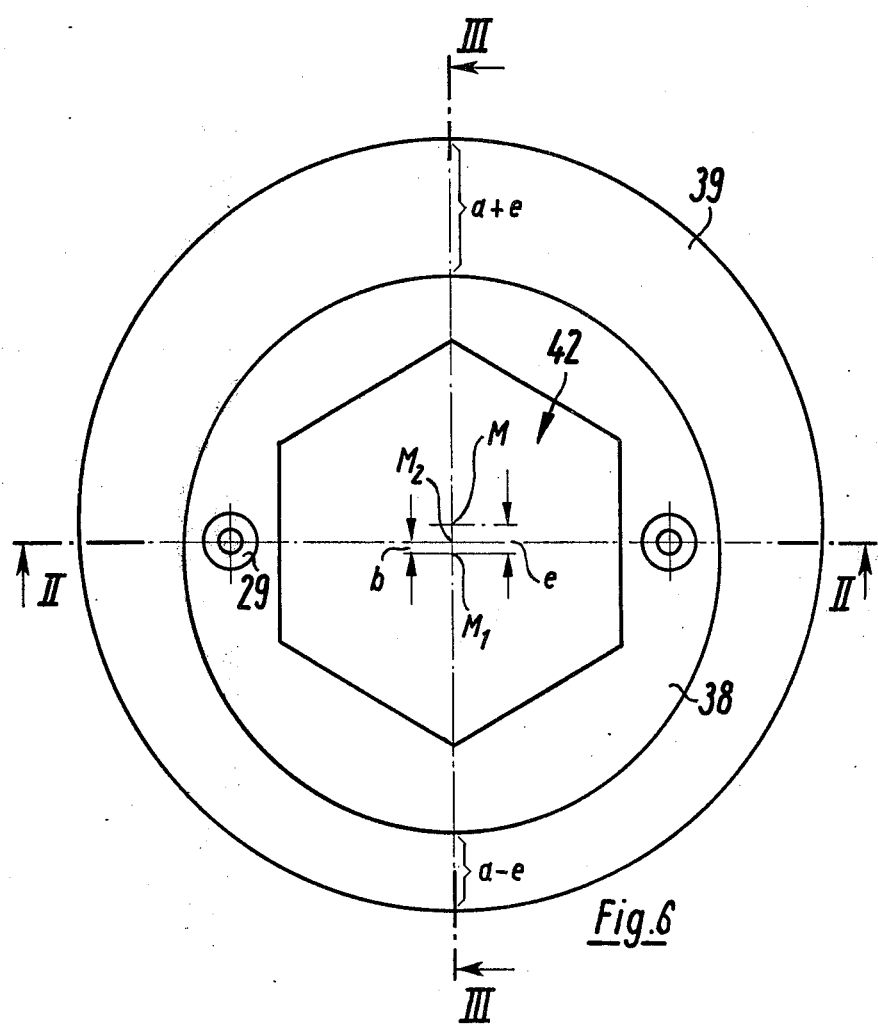

BALANCING APPARATUS FOR BLADE SETS FOR A CUTTER

The present invention relates to a balancing apparatus and, more particularly, to a cutter blade set balancing apparatus wherein the blade sets include two or more cutter blades provided with a carrier bore having a hexagonal profile, the blades being provided with one or several clamping sets containing at least one compensating ring held to be rotatable about an axis of rotation of the carrier bore of the cutter blades and having a mass distribution which is asymmetrical with respect to the axis of rotation.

To prevent cutter blades from losing their effectiveness, it is necessary to regrind cutter blades after certain operating periods. The regrinding of the cutter blades is effected with an abrasive material which, in most cases, is somewhat different at the individual cutter blades, especially if the regrinding process is also to take care of damage to the cutter blades such as, for example, nicks or the like.

As can be readily appreciated, blade sets composed of reground cutter blades, in most cases, no longer revolve true since they have frequently considerable imbalance. The imbalance leads to an increased stress on the drive shaft of the cutter and its bearing, thereby resulting in a drastic reduction in the lifetime of the bearings, requiring a replacement of the drive shaft and/or bearings and causing considerable expenses.

An apparatus has been proposed which offers the user of a cutter the possibility of rebalancing reground cutter blades prior to installation in the cutter. In the proposed apparatus, called a "balancing scale", a holding fixture for cutter blades provided with clamping sets is employed. The holding fixture is formed with a hexagonal profile corresponding to a shaft of the cutter. The holding fixture is arranged so as to be rotatable in the manner of a gyro in a certain device, whereby any imbalances of the blade sets leading to a deflection from the axis of the gyro is determined. The deflections from the gyro axis can be checked with the aid of an air bubble arranged in the holding fixture in a manner similar to that of a conventional bubble level.

To equalize the imbalances of the blade sets, a compensating ring is normally provided which can be turned about the axis of rotation of the cutter blades and can be fixed in position. The compensating ring has a mass distribution which is asymmetrical to the axis of rotation. The adjustment work necessary poses very high requirements for the user working with the proposed apparatus and satisfactory results can only be attained if the user has had corresponding training and experience. Moreover, the procedure involved with the proposed apparatus is too complicated for an untrained and inexperienced user so that, under practical conditions, satisfactory results can be achieved only in rare cases.

During the regrinding of the cutter blades, the abrasive materials not only create imbalances, but also the radial extension or length of the blades is changed. However, cutter blades must be exactly adjusted in the radial direction so that the spacing prescribed with respect to a bottom of the cutter bowl is not altered. This adjustment is an operation which, under practical conditions, must be carried out by the user in addition to the balancing step. However, this adjustment very considerably affects the balancing operation since the cutter blades must, in some cases, be relocated or repositioned in the radial direction.

The aim underlying the present invention essentially resides in providing an apparatus which effects a balance operation of sets of cutter blades and simultaneously carries out an adjustment and alignment of the cutter blades.

According to advantageous features of the present invention, by arranging a holding fixture for cutter blades and associated clamping sets on a support which is provided with fastening means for mounting the support to a wall or the like, the holding fixture can be rotated about a preferably horizontal rotary axis supported by an anti-friction bearing and inclined with respect to the vertical. The holding fixture may be adjusted to varying hexagonal profiles and the support may be provided with a marking stop adjustably arranged at the support in a radial direction with respect to the revolving axis.

By virtue of the constructional features of the present invention, it is possible to statically balance the cutter blade sets so that an indifferent equilibrium is obtained, that is, so that the cutter blade set can be turned into any desired position and then does not continue to rotate on its own. At the same time, it is also possible with the aid of the present invention to ensure, by way of the marking stop, that the desired spacing with respect to the bottom of the cutter bowl is exactly maintained.

A special advantage of the present invention resides in the fact that the apparatus can be adjusted to differing hexagonal profiles and, thus, to different cutter sizes and cutter types so that a workshop containing several cutters of varying sizes and types can utilize a single apparatus for the balancing and adjusting of the cutter blades.

In one embodiment of the present invention, the holding fixture is fashioned as a disc connected for rotation with a rotary axle with the disc carrying six pins which are adjustable in the radial direction. The pins are disposed on the disc so as to form corners of a hexagonal profile so that, within their adjusting range, practically any possible hexagonal profile of the cutter blades can be realized. Consequently, the holding fixture of the present invention can be adapted in a very simple manner to the cutter sizes and cutter types requiring adjustment, as well as a balancing of the blade sets.

Advantageously, according to the present invention, the disc is equipped with a central pin concentric with respect to the rotary axle. An adjusting disc which radially aligns the pins may be placed on the central pin. With the aid of the adjusting disc, it is possible to align the pins forming the corners of the hexagon exactly in the radial direction so that their position cannot cause imbalance. If varying cutter sizes and/or cutter types are present in a workshop, it is sufficient to provide one adjusting disc for the cutter involved so that an adjustment of the device to the respective cutter and the cutter blades used therein is then possible in a very simple and very rapid fashion.

It is also advantageous in accordance with the present invention to provide a securing bracket which may be placed on the central pin. The purpose of the securing bracket is to prevent the cutter blades from detaching themselves from the balancing apparatus and falling therefrom, which could lead to considerable harm.

In a further embodiment of the present invention, each clamping set contains two external compensating rings and two internal compensating rings having a smaller diameter. The compensating rings overlap one another and are retained at the cutter blade by means of two clamping plates. By virtue of this arrangement, four compensating rings are provided within a clamping set, thereby permitting an equalization of the imbalances in a very broad range. The two outer compensating rings serve for a relatively rough equalization of the imbalances, while the two inner compensating rings then provide for a fine adjustment.

Advantageously, according to the present invention, the clamping plates are provided with an annular collar which respectively overlaps another annular collar of the inner compensating rings which, in turn, overlaps a collar of the outer compensating rings having a larger axial extension than the clamping plates and the inner compensating rings. By virtue of this arrangement, the inner and outer compensating rings can be securely fixed in position simultaneously by way of the clamping plates and only the outer compensating rings can be stressed with an axial force when the blade sets are clamped onto the shaft of the cutter since, in such a situation, an axial compressive force can be transmitted only by the outer compensating rings, having axially the greatest extension, between them and the individual cutter blades. As a result of these features of the present invention, the inner compensating rings, the clamping plates and, in particular, their clamping elements, are not subjected to additional stresses.

In an advantageous embodiment of the present invention, the carrier bore of the cutter blades is of a hexagonal profile with mutually parallel edges of the hexagonal profile, extending in a direction of the radial extension of the cutting edge of the cutter blade, having a greater length than the other edges of the profile. A stop is provided which extends into a zone of the profile facing away from the cutting edge. By virtue of the provision of a mounting bore of the above-noted configuration, it is possible, by a subsequent machining of the stop, to exactly radially re-adjust the cutter blade after regrinding to the necessary distance from the bottom of the cutter bowl. The stop, to be machined down in accordance with the extent of regrinding, ensures that the cutter blade is in constant contact with the shaft in the radial direction, that is, in the effective direction of the centrifugal forces, so that the cutter blade cannot move unintentionally in such direction.

To effect the axial adjustment of the cutter blades without a concomitant movement of the clamping sets in the axial direction and change of their position with respect to the axis of rotation, according to the present invention, it is advantageous to brace the clamping plates with respect to each other with the aid of at least two fasteners such as, for example, screws, which extend through slotted holes of the cutter blades.

Since the individual cutter types have shafts, the profiles of which deviate somewhat in the corners of the hexagons due to different roundness, it is advantageous according to the present invention to provide the clamping plates with a central cutout in the form of a hexagonal profile so that exact adaptation is thereby made possible.

According to the present invention, flat annular discs serve as the compensating rings with the discs having a milled recess at one end face over a predetermined peripheral portion thereof. The compensating rings exhibit an outer surface which not only makes ready rotation possible, but also facilitates the cleaning thereof.

According to a further feature of the present invention, each clamping set consists of an outer compensating ring with an eccentrically arranged bore and a clamping plate with hexagonal cutout and mounting holes for the cutter blades arranged rotatably in the eccentrically arranged bore.

Advantageously, according to the present invention, the support is provided with a slot oriented radially with respect to the axis of rotation of the holding fixture with a pin, equipped with a clamping screw means, being guided in the slot and carrying a pointer associated with a scale. The pin functions or serves as a marking stop. The pin can be set with its pointer exactly to the previously known and predetermined value exactly corresponding to a spacing of the cutting edges of the cutter blades from the bottom of the cutter bowls. The necessary adjusting work and subsequent machining down of the stop of the hexagonal carrier bore of the cutter blade, which may be necessary in certain cases, is then suitably re-examined prior to the balancing step, but on the balancing apparatus.

Accordingly, it is an object of the present invention to provide an apparatus for balancing blade sets for a cutter which avoids by simple means drawbacks and disadvantages encountered in the prior art.

Another object of the present invention resides in providing an apparatus for balancing blade sets for a cutter which has a simple structure and which can be easily handled.

A further object of the present invention resides in providing an apparatus for balancing blade sets for a cutter which, in addition to effecting a balancing operation, also simultaneously carries out an adjustment and alignment of the cutter blades.

An additional object of the present invention resides in providing an apparatus for balancing blade sets for a cutter which functions reliably under all operating conditions.

Yet another object of the present invention resides in providing an apparatus for balancing blade sets for a cutter which is simple in construction and, therefore, inexpensive to manufacture.

Figure 2:
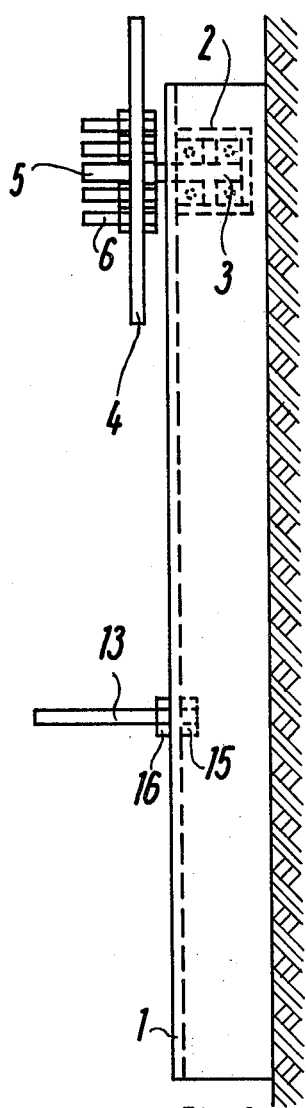
Figure 8:
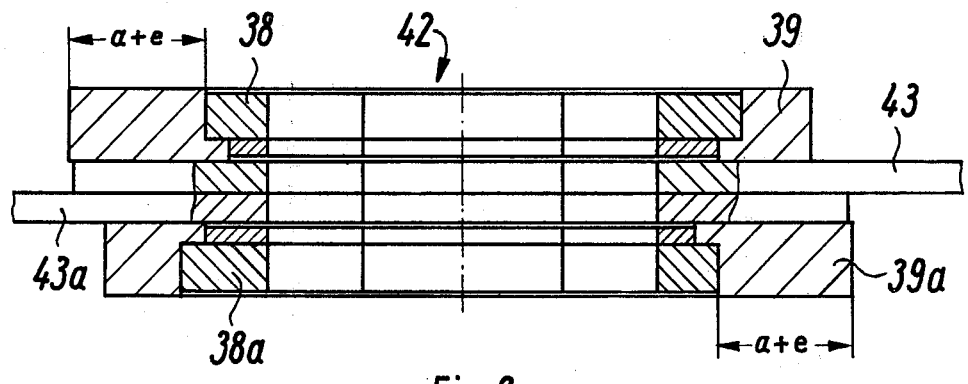

These and other objects, features and advantages of the present invention will become more apparent from the following description when taken in connection with the accompanying drawings which show, for the purposes of illustration only, several embodiments in accordance with the present invention, and wherein:

FIG. 1 is a frontal plan view of a balancing apparatus in accordance with the present invention, FIG. 2 is a lateral view of the balancing apparatus of FIG. 1, FIG. 3 is an exploded view of one-half of a clamping set for a cutter blade in accordance with the present invention, FIG. 4 is an axial cross-sectional view through a clamping set having a cutter blade mounted therein, FIG. 5 is a partial cross-sectional view, on an enlarged scale, of the balancing apparatus of FIG. 2, FIG. 6 is a top view of a further embodiment of a clamping set in accordance with the present invention in a zero position, FIG. 7 is a cross-sectional view taken along line II—II in FIG. 6, and FIG. 8 is a cross-sectional view taken along line III—III in FIG. 6.

Referring now to the drawings wherein like reference numerals are used throughout the various views to designate like parts and, more particularly, to FIGS. 1 and 2, a balancing apparatus includes a support 1 constructed as, for example, a U-profiled rail which can be attached, in a manner not shown in detail, to a wall or the like by fasteners such as screws or the like so that the legs of the profiled rail abut or stand on the wall. The profiled rail support 1 is attached to the wall so that it extends either vertically or horizontally. A bearing housing 2 is provided in a zone of one end of the support 1 with an axle 3, preferably having two anti-friction bearings, being rotatably arranged in the bearing housing 2 so as to be disposed horizontally.

A disc 4 is connected to the rotary axle for rotation therewith. A central pin 5 is provided and forms an extension of the rotary axle 3 so that the rotary axle 3 projects from the disc 4 toward the outside thereof. The disc 4 forms a holding fixture for a clamping set for cutter blades (FIG. 3) in a manner described more fully hereinbelow.

For the purpose of holding the clamping set or sets for a cutter blade, six pins 6 are arranged on the disc 4 with the pins being guided in slots or holes 7 extending radially with respect to the rotary axle 3 and/or the central pin 5. The pins are adjusted in such a manner that they are respectively disposed at the corner points of a hexagon 8, illustrated in phantom lines in FIG. 1. The hexagon 8 corresponds to a profiled carrier bore of a cutter blade.

In use, two or more cutter blades, held by a clamping set, are placed on the pins 6 and, if the blade set shows imbalance, especially following a regrinding of the cutter blades, the blade set will rotate into the position wherein no moment due to gravity is any longer effective on the blade set, that is, the imbalance has arrived at the lowest point in the vertical direction. By suitable measures explained more fully hereinbelow, a static balancing can then be achieved so that the entire blade set is placed into indifferent equilibrium wherein the blade set remains arrested in whatever position it is rotated.

Cutter blades 9 of the type illustrated, for example, in FIG. 3, must be reground or rehoned after a certain operating period. After a regrinding or rehoning, the blades 9 must then be adjusted on the drive shaft of the cutter in the radial direction so that the predetermined spacing with respect to the bottom of the cutter bowl is maintained. The cutter blades 9 are provided with a carrier bore generally designated by the reference numeral 10 having a hexagonal profile.

In the embodiment of the cutter blades shown in FIG. 3, two lateral edges 11 extending in parallel to each other and essentially in the direction of the cutting edge of the cutter blade 9 have a longer length than the remaining lateral edges of the carrier bore 10. The longer length of the lateral edges is compensated for by a projection 12 which extends on the side facing away from the cutting edge of the cutter blade 9 between the two parallel lateral edges 11 into a zone of the somewhat elongated hexagon. If the cutting edge of the cutter blade is reground, the projection 12 is shortened by machining or the like by an appropriate amount so that it is possible to arrange the cutter blade 9 on the drive shaft of the cutter in such a way that the distance from the bottom of the cutter bowl is preserved, that is, the radial length or extension of the cutter blade 9 corresponds to the length prior to the cutter blade 9 being reground or rehoned. By this arrangement, the projection 12 always contacts an edge of the hexagonal profile of the shaft of a cutter so that, due to the centrifugal force during operation, the radial position of the cutter blades 9 does not vary.

The apparatus of FIGS. 1 and 2 is utilized to examine or determine the length of the cutter blade 9. For this purpose, the apparatus is provided with a marking stop 13 adjustably mounted to the support 1 in the radial direction with respect to the rotary axle 3. The support 1, fashioned as a U-shaped profile, has a longitudinal slot 14 extending radially to the axle 3. The marking stop 13 is received in the longitudinal slot 14. The marking stop 13 is provided with an outer thread and a head 15 and is constructed as a pin which can be clamped in selectable position by means of a nut 16. The marking stop 13 is provided with a pointer element 17 associated with a scale 18 of the support 1. The scale 18 is graduated in millimeters and provides an indication of the depths of the cutter bowls. The elongated slot 14 and the support 1 are dimensioned so that practically all possible types of cutter bowls can be checked.

To examine the length of a cutter blade 9 after, for example, a regrinding or rehoning, the cutter blade or blades 9 would be placed on the pins 6, which are previously adjusted so as to accommodate the specific carrier bore of the cutter blade or blades 9 being examined. With the pointer 17 of the marking stop 13 being set to the proper indicia on the scale 18 corresponding to the depth of the cutter bowl of a given cutter, it can then be determined if the regrinding or rehoning of the cutter blade or blades 9 resulted in a shortening of the radial extent or length of the blades 9 by noting the difference between the end of the blade 9 and the position of the pointer 17. If the blade has been shortened, the projection 12 is then machined by the corresponding amount so that the blade 9 is properly dimensioned for the depth of the cutter bowl of the given cutter.

As can be seen most clearly in FIGS. 1 and 5, the disc 4 has six radial slots 7 in which the pins are adjustably guided. The pins 6 have a cylindrical configuration and are provided with a collar 19 forming a hexagon by which the pins 6 contact the disc 4 on the outside thereof. The ends of the pins 6 extend through the radial slots 7 and are provided with external threads on which a nut 20 is threaded. The nut 20 and external threads permit the pins 6 to be clamped in any desired position in the radial slots 7 of the disc 4.

To be able to fasten the pins 6 in exact aligned spacings, an adjusting disc 21, shown in phantom lines in FIG. 5, is placed on the central pin 5 forming an extension of the rotary axle 3. The pins 6 are exactly aligned on the adjusting disc 21 and, in this connection, as shown in phantom lines in FIG. 4, a pressure ring 22 can be used as an aid in aligning the pins 6. The pressure rings 22 serve for mutually bracing the clamping sets of the individual cutter blades in the axial direction by means of a nut threaded onto the shaft of the cutter. The pressure rings 22 have an inner recess adapted to the configuration of the hexagon of the respective cutter shaft. Therefore, it is also possible to utilize a pressure ring 22 for adjusting the pins 6 which are then fixed in their radial position by the adjusting disc 21, as well as by the pressure ring 22.

As shown in FIG. 5, the central pin 5 is provided with an outer thread 23 to which is attached a nut 24 for holding a securing bracket 25. The securing bracket 25 has two ends, slotted in the manner of a fork, emanating from a central part 25′ provided with a bore 25″. The ends of the securing bracket 25 each encompass a respective one of the pins 6. The securing bracket serves the purpose of securing any blade sets which may be arranged on the apparatus against an unintended dropping.

FIGS. 3 and 4 provide an illustrated example of a cutter blade provided with a clamping set. While FIG. 3 illustrates only one-half of the clamping set, that is, only the parts arranged on one side of the cutter blade 9, as apparent from FIG. 4, identical components are arranged on the opposite side of the cutter blade 9 which differ only by a detail of the clamping plate 26.

As shown in FIGS. 3 and 4, each of the clamping sets includes two clamping plates 26, an inner compensating ring 27 and an outer compensating ring 28. The clamping plate 26 on one side is provided with countersunk passage bores 29 in which countersunk screws 30 can be inserted which are screwed into threaded bores 31, corresponding to the passage bores 29 of the other clamping plate.

The circular clamping plates 26 are provided with an inner cutout which has an hexagonal profile corresponding to the profile of the shaft of the respective cutter. During the clamping step, the countersunk screws 30 penetrate the cutter blade 9 in a zone of slotted holes 32 located laterally beside the extended parallel lateral edges of the carrier bore 10 of the cutter blade 9 and are oriented in the same direction. By virtue of this arrangement, it is possible to adjust the cutter blades 9 in the radial direction without the parts of the clamping sets participating in an adjusting motion.

The clamping plates 26 are also provided with offset collars 33 which extend over corresponding offset collars 34 of the inner compensating ring 27. The compensating ring 27 overlaps an offset collar 35 of the outer compensating ring 28 contacting a clamping surface of the cutter blade 9. The outer compensating rings 28 are dimensioned so that they exert their supporting effect in an axial direction toward both sides by way of the clamping plates 26, as well as by way of the inner compensating rings 27 so that, with an axial bracing of several such clamping sets and the aid of two pressure plates arranged on a shaft of the cutter, there is exclusively a force transmission in the axial direction by way of the outer compensating rings 28 and the cutter blades 9. The inner compensating rings 27 and the clamping plates 26 are not impaired by the clamping force, that is, the countersunk screws 30 arranged hidden within one of the clamping plates 26 are not affected thereby either.

It is also possible by means of a six-part clamping set of the afore-mentioned type to simultaneously clamp two cutter blades 9 arranged offset by 180° with respect to each other. For this purpose, only the countersunk screws 30 are changed and are then provided with a greater axial length in correspondence with the thickness of the second cutter blade 9.

When the cutter blades 9 are reground, the adjustment with respect to the radial length is initially examined on the apparatus of FIGS. 1 and 2 and, if necessary, the projection 12 is machined. For this purpose, it is advantageous if the clamping sets are not connected with the cutter blade 9 at the time of the examination. If the radial adjustment is correct, the clamping sets are then connected with the cutter blade or blades 9, after which the static balancing is performed.

For the static balancing, the compensating rings 27 and 28 of both sides can be turned about the rotary axle 3 of the apparatus. The compensating rings 27 and 28 are respectively provided on their end faces with milled recesses 36, 37 so that an asymmetrical mass distribution is obtained with respect to the axis of rotation or the rotary axle 3.

To facilitate the static balancing, the outer compensating rings can suitably be provided with markings on their circumference, which markings characterize the starting position, that is, the balancing position in case of blades which are new and have not yet been reground. The balancing work is substantially facilitated if an additional indication is provided as to the direction in which an adjustment must take place by twisting or turning the compensating rings 28 or 27.

In the balancing operation, a relatively rough balancing effect is obtained by the outer compensating rings 28, while the compensating rings 27 make it possible to carry out a subsequent relatively sensitive balancing step.

If a cutter is to be equipped with an even number of blades, provision is made that one clamping set made up of the outer and inner compensating rings 28 and 27, respectively, and the clamping plates 26 receives two cutter blades 9 displaced with respect to each other by 180°, which are then individually aligned on the apparatus of FIGS. 1 and 2. If a blade arrangement having an odd number of blades is to be utilized, especially an arrangement of blades respectively displaced by 120°, then a separate clamping set is suitably provided for each cutter blade. In this case, balancing takes place by subjecting the respective three cutter blades, each provided with its own clamping set, to the balancing step on the apparatus of FIGS. 1 and 2.

In a manner not illustrated in detail, the apparatus may be equipped with a means engaging the disc 4 or the rotary axle 3 for securing or fixing the same against unintended rotation. Such securing or fixing means is advantageous if cutter blades 9 of an odd number are to be aligned and balanced since otherwise there is the danger of an unintended turning taking place with a relatively high force in situations wherein there are no longer all, or not yet all, of the cutter blades with their clamping sets arranged on the balancing apparatus. Such a fixation means may, for example, contact the rear side of the disc 4 with a friction lining or the like. Advantageously, a lever system (not shown), constructed as a toggle clamp with a beyond-dead-center position, could be employed so that the securing or fixing means can be released without releasing the disc 4. The same result may also be attained with a special locking means which locks the disc 4 or rotary axle 3 at least in the clamped position. It is also possible to utilize portions of the pins 6 which project beyond the rear side of the disc 4 by providing a shape-mating connection between the locking means and the respective pins.

As shown in FIGS. 6, 7 and 8, an inner circular clamping plate 38 is provided with two mounting holes 29 to affix the same to cutter blades 43, 43a. The clamping set contains the clamping plates 38, 38a with mounting holes 29 in the clamping plate 38a arranged in a mirror-image symmetry, but offset by 180°, serving for receiving the thread of the screws which are inserted into the mounting holes 29. The clamping plate 38 extends over a collar 40 of the compensating ring 39 so that compensating ring 39, together with the clamping plate 38, can be fixed in a specific mutual position at the cutter blade set consisting of the two blades 43, 43a offset with respect to each other by 180°. An elastic intermediate disc 44 can be provided between the blades 43 and the clamping plates 38.

As shown most clearly in FIG. 6, the bore forming the collar 40 of the compensating ring 39 is eccentrically displaced by an amount e with respect to the center M of the compensating ring 39 so that a point $M_1$ is the center of the clamping plate 38. It is now possible to make the center of a hexagon generally designated by the reference numeral 42 congruent with the center M of the compensating ring 39. However, in practice, it has proved to be advantageous to place the center $M_2$ of the hexagon 42 so that it deviates by an amount b from the eccentricity between the centers M, $M_1$.

Since the second lower part of the clamping set, consisting of the compensating ring 39a and clamping plate 38a, is offset in mirror-image symmetry to the dividing plane between the blades 43, 43a, but with respect to the imbalanced position a+e by 180° with respect to the upper parts, the blade clamping system has no imbalance in this position. By rotating the compensating rings 39 and 39a with respect to the clamping plates 38, 38a, a total eccentricity can then be set so that the desired balancing operation is possible in a simple manner.

The adjusted position of the blades 43, 43a can be fixed by tightening the screws inserted into the mounting holes 29 and threaded into the threaded bores of the clamping plate 38a. The thus balanced blade set is then placed with the hexagon 42 onto a horizontal shaft of the cutting machine. Fastening of the blade set at the shaft of the cutting machine is effected by way of pressure plates which press exclusively on the compensating rings 39, the thickness of which, as can be seen from FIG. 7, is somewhat larger than the thickness of the clamping plates 38.

While I have shown and described several embodiments in accordance with the present invention, it is to be understood that the same is not limited thereto, but is susceptible of numerous changes and modifications as known to those skilled in the art, and I therefor do not wish to be restricted to the details shown and described hereinabove, but intend to cover all such changes and modifications as are encompassed by the scope of the appended claims.

I claim:

1. An apparatus for a balancing of blade sets for a cutter, the blade sets including at least two cutter blades, each of which is provided with a carrier bore having a hexagonal profile, the cutter blades being provided with at least one clamping set containing at least one compensating ring, the at least one compensating ring is held to be rotatable about an axis of rotation of the carrier bore of the cutter blades and has a mass distribution which is asymmetrical with respect to the axis of rotation of the carrier bore, characterized in that a holding fixture means is provided for holding the cutter blades and the at least one clamping set, a support means is mounted on a fixed supporting surface and has said holding fixture means mounted thereon, a substantially horizontally extending rotary axle is mounted in said support means, said holding fixture means is mounted so as to be rotatable about an axis of rotation of said rotary axle, means are provided on said holding fixture means for adjusting said holding fixture means so as to accommodate carrier bores having differing hexagonal profiles, and in that a marking stop means is attached to said support means, said marking stop means is adjustable in a radial direction with respect to the rotary axle.

2. An apparatus according to claim 1, characterized in that the holding fixture means includes a disc, and six pins arranged on said disc so as to be adjustable in a radial direction with respect to the rotary axle, and in that means are provided for connecting the disc to the rotary axle so as to permit rotation therewith.

3. An apparatus according to claim 2, characterized in that said connecting means includes a center pin means concentric to the rotary axle, and in that an adjusting disc means is provided for aligning the six pins with respect to said center pin means.

4. An apparatus according to claim 3, characterized in that a securing bracket means is attached to the center pin means for securing the blade sets to the apparatus.

5. An apparatus according to one of claims 1, 2, 3 or 4, characterized in that a plurality of clamping sets are provided, each clamping set includes two outer compensating rings and two inner compensating rings, the inner compensating rings have a smaller diameter than a diameter of the outer compensating rings, the compensating rings are arranged so as to overlap each other, and in that two clamping plate means are provided for holding the compensating rings at the cutter blades.

6. An apparatus according to claim 5, characterized in that the clamping plate means, the inner compensating rings and the outer compensating rings each include a collar, the respective collar of the clamping plate means overlaps a collar of the inner compensating rings and the respective collar of the inner compensating rings overlaps the collar of the outer compensating rings, and in that the outer compensating rings have a greater axial dimension than the clamping plate means and the inner compensating rings.

7. An apparatus according to claim 6, characterized in that the hexagonal profile of the carrier bore includes mutually parallel edges extending essentially in a direction of a radial extension of a cutting edge of the cutter blade, the mutually parallel edges have a length which is greater than a length of remaining edges of the hexagonal profile of the carrier bore, and in that a projection extends in the hexagonal profile in an area facing away from the cutting edge of the cutter blade for compensating for variations in a radial length of the cutter blades.

8. An apparatus according to claim 7, characterized in that means are provided for bracing the clamping plate means with respect to each other.

9. An apparatus according to claim 8, characterized in that said bracing means includes at least two screws extending through slotted holes provided in the cutter blades.

10. An apparatus according to claim 8, characterized in that each of the clamping plate means includes a central cutout in the form of a hexagonal profile.

11. An apparatus according to claim 10, characterized in that the inner and outer compensating rings are constructed as flat annular discs, and in that each of the annular discs are provided with a milled recess on one end face over a predetermined peripheral area thereof.

12. An apparatus according to one of claims 1, 2, 3 or 4, characterized in that each clamping set includes an outer compensating ring having an eccentrically arranged bore, a clamping plate means rotatably arranged in said eccentrically arranged bore, the clamping plate means includes a hexagonal cutout and mounting means for affixing the clamping plate means to the cutter blades.

13. An apparatus according to claim 12, characterized in that the outer compensating ring includes a collar, and in that the clamping plate means extends over the collar of the outer compensating ring for fixing the mutual position of the clamping plate means and the outer compensating ring.

14. An apparatus according to claim 12, characterized in that a center of the hexagonal cutout is arranged eccentrically with respect to a circumference of the clamping plate means approximately by an amount corresponding to an eccentricity of the eccentrically arranged bore in the outer compensating ring.

15. An apparatus according to claim 14, characterized in that the outer compensating ring includes a collar, and in that the clamping plate means extends over the collar of the outer compensating ring for fixing the mutual position of the clamping plate means and the outer compensating ring.

16. An apparatus according to claim 15, characterized in that the compensating ring has a greater thickness than a thickness of the clamping plate means.

17. An apparatus according to claim 16, characterized in that the support means is provided with a slot arranged so as to extend radially outwardly with respect to the rotary axle of the holding fixture means, said marking stop means includes a pin provided with a clamping screw means, said pin is guided in said slot and carries a pointer cooperable with a scale provided on said support means in proximity to said slot.

18. An apparatus according to one of claims 1, 2, 3 or 4, characterized in that fastening means are provided for attaching the support means to the fixed supporting surface.

19. An apparatus according to claim 18, characterized in that anti-friction bearing means are provided for supporting the rotary axle at an inclination with respect to a vertical plane.

20. An apparatus according to one of claims 1, 2, 3 or 4, characterized in that the support means is provided with a slot arranged so as to extend radially outwardly with respect to the rotary axle of the holding fixture means, said marking stop means includes a pin provided with a clamping screw means, said pin is guided in said slot and carries a pointer cooperable with a scale provided on said support means in proximity to said slot.

21. An apparatus according to one of claims 1, 2, 3 or 4, characterized in that the hexagonal profile of the carrier bore includes mutually parallel edges extending essentially in a direction of a radial extension of a cutting edge of the cutter blade, the mutually parallel edges have a length which is greater than a length of remaining edges of the hexagonal profile of the carrier bore, and in that a projection extends in the hexagonal profile in an area facing away from the cutting edge of the cutter blade for compensating for variations in a radial length of the cutter blades.

* * * * *